United States Patent
Pepka

(10) Patent No.: US 9,360,073 B2
(45) Date of Patent: Jun. 7, 2016

(54) TENSION SPRING MOUNT WITH FRICTION-RESISTANT COATING

(71) Applicant: Renton Coil Spring Company, Renton, WA (US)

(72) Inventor: Charles F. Pepka, Renton, WA (US)

(73) Assignee: Renton Coil Spring Company, Renton, WA (US)

(*) Notice: Subject to any disclaimer, the term of this patent is extended or adjusted under 35 U.S.C. 154(b) by 224 days.

(21) Appl. No.: 13/829,830

(22) Filed: Mar. 14, 2013

(65) Prior Publication Data

US 2013/0200557 A1    Aug. 8, 2013

Related U.S. Application Data

(63) Continuation-in-part of application No. 12/710,899, filed on Feb. 23, 2010.

(51) Int. Cl.

| F16F 1/06 | (2006.01) |
|---|---|
| F16F 1/12 | (2006.01) |
| F16F 3/06 | (2006.01) |
| F16F 3/04 | (2006.01) |

(52) U.S. Cl.
CPC . *F16F 1/12* (2013.01); *F16F 1/125* (2013.01); *F16F 3/04* (2013.01); *F16F 3/06* (2013.01); *F16F 2236/06* (2013.01)

(58) Field of Classification Search
CPC ... F16F 1/12; F16F 15/1343; F16F 15/13461; F16F 1/024; F16F 1/047; F16F 2236/06; F16F 15/046; F16F 15/13446
USPC .......... 267/73, 138, 289, 290, 174, 168–170, 267/179
See application file for complete search history.

(56) References Cited

U.S. PATENT DOCUMENTS

| 756,175 | A | | 3/1904 | Meisselbach et al. |
|---|---|---|---|---|
| 1,486,295 | A | * | 3/1924 | Mullen ................ B60G 11/16 267/237 |
| 2,248,447 | A | * | 7/1941 | Wood ........................ 267/168 |
| 3,030,056 | A | * | 4/1962 | Rogers ....................... 248/565 |
| 3,779,537 | A | * | 12/1973 | Kalister ..................... 267/166.1 |
| 4,174,099 | A | | 11/1979 | Yamasaki |
| 4,653,736 | A | * | 3/1987 | Pontoppidan ............... 267/70 |
| 4,712,778 | A | | 12/1987 | Newman |
| 4,731,902 | A | | 3/1988 | Johnston |

(Continued)

FOREIGN PATENT DOCUMENTS

| DE | 3631233 A1 * | 3/1988 | ............ F16F 1/125 |
|---|---|---|---|
| DE | 102011108852 A1 | 1/2013 | |

(Continued)

*Primary Examiner* — Robert A Siconolfi
*Assistant Examiner* — Mahbubur Rashid
(74) *Attorney, Agent, or Firm* — Lowe Graham Jone PLLC

(57) ABSTRACT

End mounts are used to secure a helical tension spring to end fixtures with various shapes and sizes. These end mounts contain an inner hole to encase the inner spring end mount and secure the end mount making it like a cap. There is also a keyhole created in the top surface that goes through the end mount allowing it to fit over the fixtures but not over the inner end mount, holding it in place. Grooves are machined in a helical pattern on the cylindrical side wall of the end mount. The spring is wound onto the grooves of the end mount. A friction-resistant coating is applied between components of the assembly to mitigate wear and to prevent bending and twisting.

40 Claims, 9 Drawing Sheets

(56) References Cited

U.S. PATENT DOCUMENTS

| | | |
|---|---|---|
| 4,817,927 A | 4/1989 | Martin |
| 4,869,473 A | 9/1989 | Giovanni |
| 7,568,682 B2 * | 8/2009 | Seelmann et al. ............ 267/179 |
| 2005/0048263 A1 * | 3/2005 | Ford et al. .................... 428/143 |
| 2005/0092961 A1 | 5/2005 | Ucman |
| 2011/0204550 A1 | 8/2011 | Pepka |

FOREIGN PATENT DOCUMENTS

| | | |
|---|---|---|
| EP | 1624219 A1 | 2/2006 |
| WO | WO 2007118058 A2 * | 10/2007 |
| WO | 2011094163 A1 | 8/2011 |

* cited by examiner

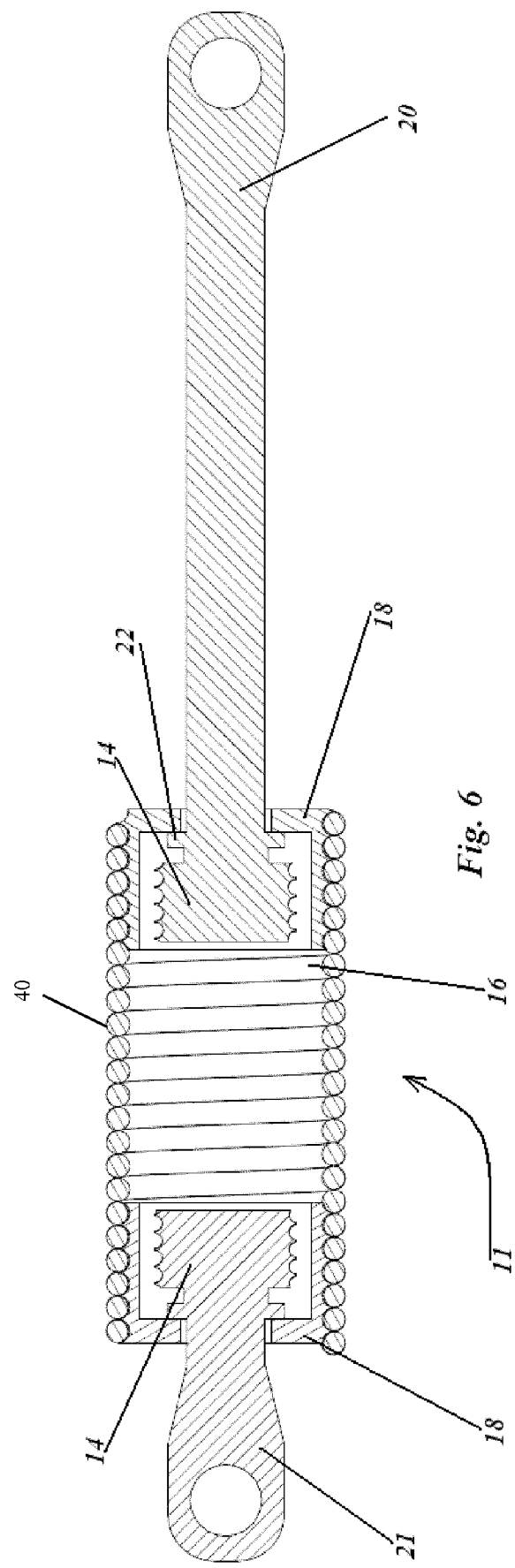

TENSION SPRING MOUNT WITH FRICTION-RESISTANT COATING

PRIORITY CLAIM

This application is a continuation-in-part of co-pending U.S. patent application Ser. No. 12/710,899 filed Feb. 23, 2010, which is incorporated herein by reference in its entirety.

FIELD OF THE INVENTION

This invention relates generally to mounts for springs and, more specifically, to end-mounting tension springs and associated friction-resistant coatings.

BACKGROUND OF THE INVENTION

Nested springs are used for various applications. For example, they can be used in the landing gear of airplanes, or on any type of device for securing fixtures to a relatively moving component. They have been used where reliability is paramount or in some situations to reduce the space envelope required where the spring is mounted. Examples of applications of nested springs are throttle return springs, brake return springs, and valve springs.

Often, nested springs are used to avoid single-point failures by providing a redundant system. They replace a single-spring system. In a single-spring system however, when the spring fails, the whole system fails. Having a dual spring system increases the factor of safety. If one spring fails, the other can still properly function for a time until the broken spring is replaced. In some cases, the springs wear, twist, or bend excessively where portions of the spring contact one another. The effect is worsened where the contact is acute, such as with a small contact surface area under high load. Also, some materials are abrasive, such as Titanium, and wear more quickly than other materials.

SUMMARY OF THE INVENTION

The present invention relates to mounts for springs. More specifically, the present invention comprises an end-mount system for tension springs to attach to fixtures in various applications using grooves and spring tension to keep the spring and fixtures secured together. The system comprises an inner spring and end mount along with an outer spring, encasing the inner spring, and outer end mount resting on the inner end mount. These are attached to fixtures on either end, which can differ depending on the application.

In accordance with further aspects of the invention, the end mounts are cylindrical in shape to allow for the helical tension spring to be secured to the end mount by way of being wound onto grooves on the end mount. The grooves of the end mount in one embodiment have a greater pitch than the pitch of the tension spring before being secured to the mount. In a preferred embodiment, the pitch of the mounting portion of the spring has a greater pitch than the remainder of the spring, to match the pitch of the mount grooves. The inner diameter of the grooves is slightly larger than the coil diameter of the spring. As the spring is tensioned the increased inward forces of the spring hold the spring on the end mount in a fashion similar to a Chinese finger trap. If the spring were free of the end mount these forces would tend to reduce the spring diameter all along the spring.

In accordance with other aspects of the invention, the end mounts have keyholes to fit over end fixtures. The keyholes are shaped so that the end mount fits over the fixture but not over the inner spring and inner end mount. The keyhole can be any shape as long as it fills this purpose.

In accordance with still further aspects of the invention, the fixtures are machined or attached to the inner spring end mount. These fixtures can be a variety of shapes and sizes depending on the application at hand.

In accordance with yet other aspects of the invention, a dual spring system, with an outer spring encasing an inner spring, allows each spring to be reduced in mass and the strength of the system increases greatly. In addition, a measure of safety is added with another spring introduced to the system. The resonant frequency of the combined spring system is also dramatically changed in comparison to a single spring system for the same application. This change in frequency can also be used to increase the safety of the overall system by avoiding dangerous frequency coupling.

As may be appreciated from the foregoing summary, the invention provides a more secure and clean attachment that adds a factor of safety, is reliable in spring attachments without fasteners, and saves weight.

BRIEF DESCRIPTION OF THE DRAWINGS

Preferred and alternative embodiments of the present invention are described in detail below with reference to the following drawings:

FIG. 6 is a side view of the outer portion spring assembly.

DETAILED DESCRIPTION OF THE PREFERRED EMBODIMENT

Figure 1:
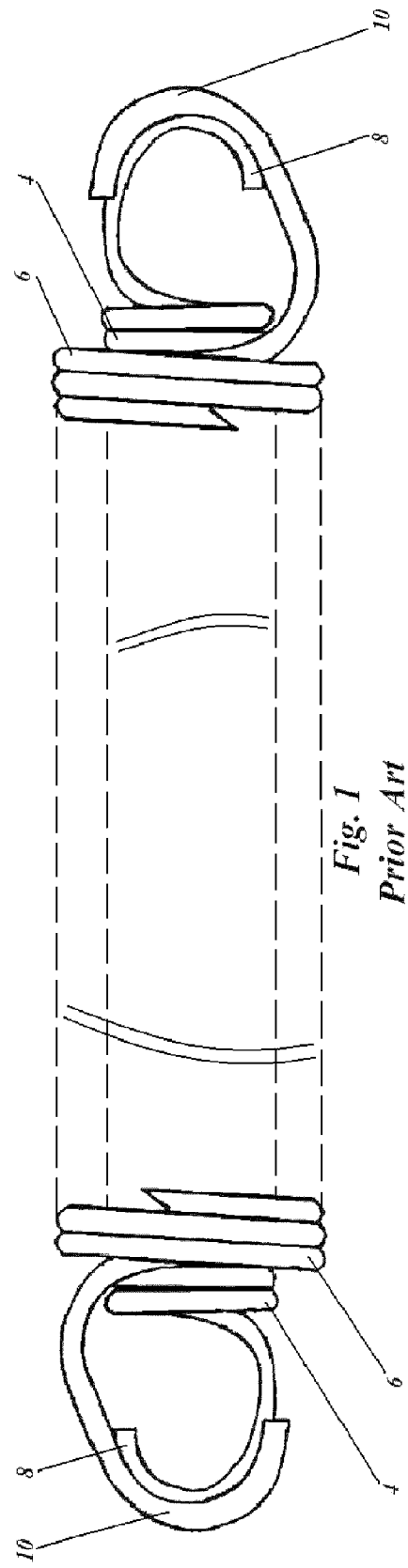
FIG. 1 is a side view of a prior-art nested tension spring arrangement.

As illustrated in FIG. 1, prior-art nested tension springs 4, 6 use opposing hooks to restrain the spring from releasing from their mount locations. The outer hook 10 opposes the inner hook 8. It is to be noted that the previous tension springs 4, 6 typically failed at the hook most particularly at the location where the large bending stress on the hook met the large torsion stress coming from the coil under a tensile load. The relationship of the hooks 8, 10 to the springs 4, 6 will be better understood after the following description. The operation of the springs 4, 6 may be understood upon reference to FIG. 1. The embodiment consists of two tensions springs 4, 6, an inner spring 4 and an outer spring 6. The above springs 4, 6 connect at hooks 8, 10 on either end. These springs 4, 6 are assembled together so that the coiled spirals are wound in opposing directions. The hooks 8, 10 however, are connected to fixtures in such a manner that upon application of repeated tensile forces the hooks may fail. These hooks 8, 10 do not have a clean or secure attachment. Stress concentrations arise at the fixture or element to which the hooks secure and at the bend in the hooks prior to the windings. Also with the prior art, when one spring fails, the hooks move, often causing the entire system to fail.

To resolve the difficulty noted above, embodiments of the present invention include an inner spring 12 and an outer spring 16 that are connected to fixtures with end mounts 14, 18 in such a manner that upon application of tensile forces there is much less chance for failure and a more secure and clean attachment. These end mounts 14, 18 may be machined from various materials such as metals, plastics, or composites. The relationship of the end mounts 14, 18 to the embodiment will be better understood upon reference to FIG. 2.

Figure 2:
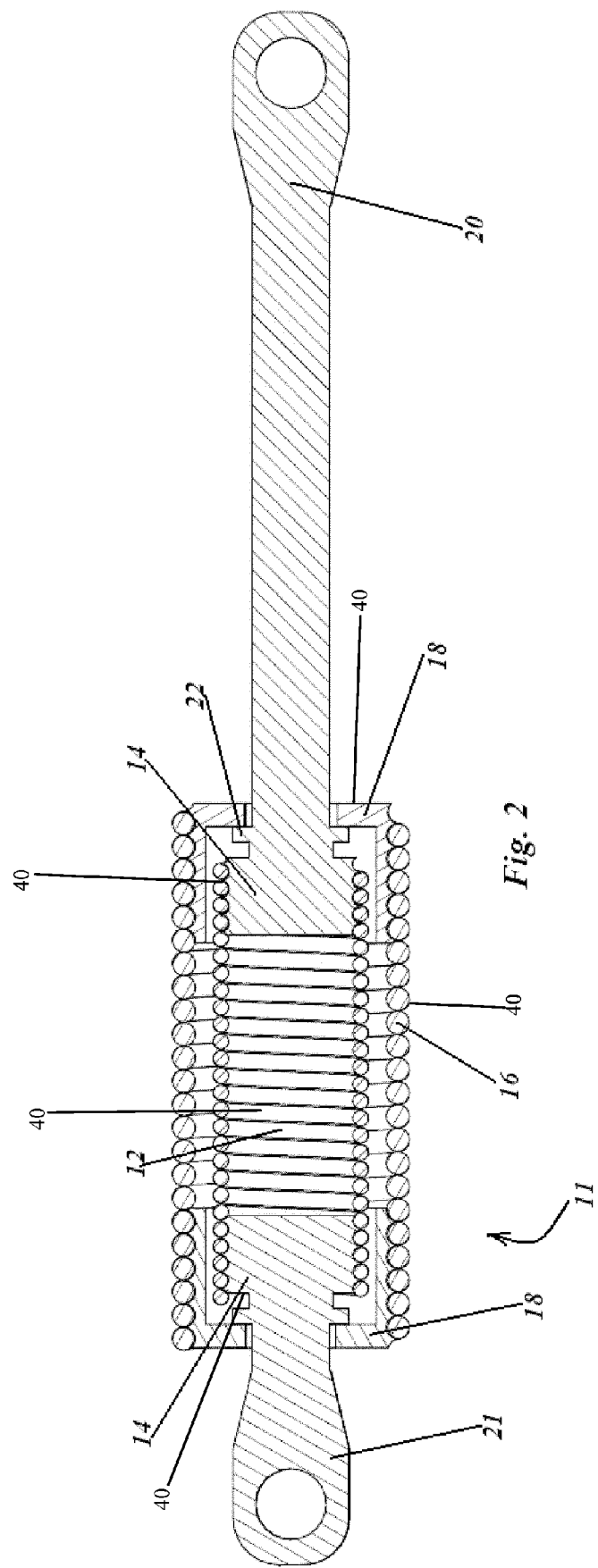
FIG. 2 is a side view of the spring assembly.

FIG. 2 shows a spring assembly 11 including an inner spring 12 attached to fixtures 20, 21 with end mounts 14 on either end. Surrounding the inner spring 12 is the outer spring 16 wound onto end mounts 18. Any component of the spring assembly 11 can have a coating 40 applied to the outer surface to ease friction, prevent bending, twisting, and other wear that may occur between contacting portions of the spring assembly 11. The springs 12, 16, the end fittings 14, 18, and any other component of the assembly 11 can have the coating 40. The coating 40 can be between any two contacting surfaces. The coating 40 can be applied to either one of the contacting surfaces or to both contacting surfaces. For example, the coating 40 can be applied to the grooves of the end fittings 14, 18, or to the springs 12, 16, or to both the end fittings 14, 18 and the springs 12, 16. The coating 40 can be a Nylon material, such as Nylon 11 or another suitable coating material. The coating 40 can be any suitable thickness. In some embodiments the coating 40 is approximately 0.011 inches thick. The coating 40 can be applied through a powder coating application method to the external surface of the springs 12, 16. In some embodiments the springs 12, 16 are made of a material such as 15-5 ph stainless steel or titanium. Some materials wear more quickly than others. In particular, titanium is abrasive and may wear through other contacting materials if subjected to sufficient stress. The coating 40 minimizes wear from twisting, bending, and other deformation as well as from friction.

The assembly 11 includes more than one spring, so each individual spring can have a lower mass as strength from multiple springs is combined. As a result of the lower mass of each individual spring in the system, the dual-spring embodiment has a higher intrinsic natural frequency. This higher natural frequency adds safety as the frequency is out of the range of frequencies experienced in use. When the apparatus experiences frequencies similar to its natural frequency it can more easily fail. This has been seen in airplane landing gear. Because the natural frequency of the system is higher a measure of safety is added.

Returning to the end mounts 18, the inner diameter of the grooves 28 in end mounts 18 is slightly larger than the resting coil diameter of the outer spring 16. For this reason, coupled with the fact that the mentioned springs are tension springs, as the spring is introduced to tension the spring diameter naturally tends to decrease, however, the end mount 18 forces the coil diameter to remain the same on the end mounts 18. This makes the outer spring 16 compress around the end mount 18, holding it on securely without slippage. The coating 40 mitigates wear between the spring 16 and the end mount 18, which is especially beneficial given the pressure created between these two members when the spring 16 is in tension and therefore constricts around the end mount 18. Slippage in the axial direction is prevented by the end mount 18, but the coating 40 can allow the spring 16 to move slightly relative to the end mount 18 in a circumferential direction as the spring 16 is tensioned. During tensioning of the spring a slight twist is induced in the spring. Slight movement of the spring away from the end mount occurs, especially where the spring exits the end mount. The coating 40 applied to the groove of the end mount where the spring exits provides a smooth, durable interface to resist wear on the mount and the spring.

Also notable to mention, in some embodiments the grooves 28 in which the outer spring rests in the end mounts 18 may be spaced further apart than the natural pitch of the outer spring 16. This creates an associated tension on the grooves 28 of the end mount 18 as the outer spring 16 tries to recoil to its free length. In the preferred embodiment, the ends of the springs are manufactured with a greater pitch to more closely match the pitch of grooves 28. Such springs are easier to secure to the mounts. However, slippage is still avoided due to the tighter grip of the spring upon tensioning, as discussed above.

Another advantage these end mounts 18 provide for the embodiment is that if one spring fails the end mounts 14, 18 hold the other spring in the same alignment. With the prior art the hooks 8, 10 move when one spring fails. Such movement can be a problem, especially with a tight space envelope or if the springs are near a fuel tank or other combustible where a spark may be an issue. The coating 40 further prevents friction that may cause sparks, further mitigating this risk. Furthermore, since conventional fasteners are eliminated, failures are further reduced. There are fewer parts to fail. The bending stresses are minimized and the torsional stresses are spread over multiple coils in the end-mounting region.

Figure 5A:
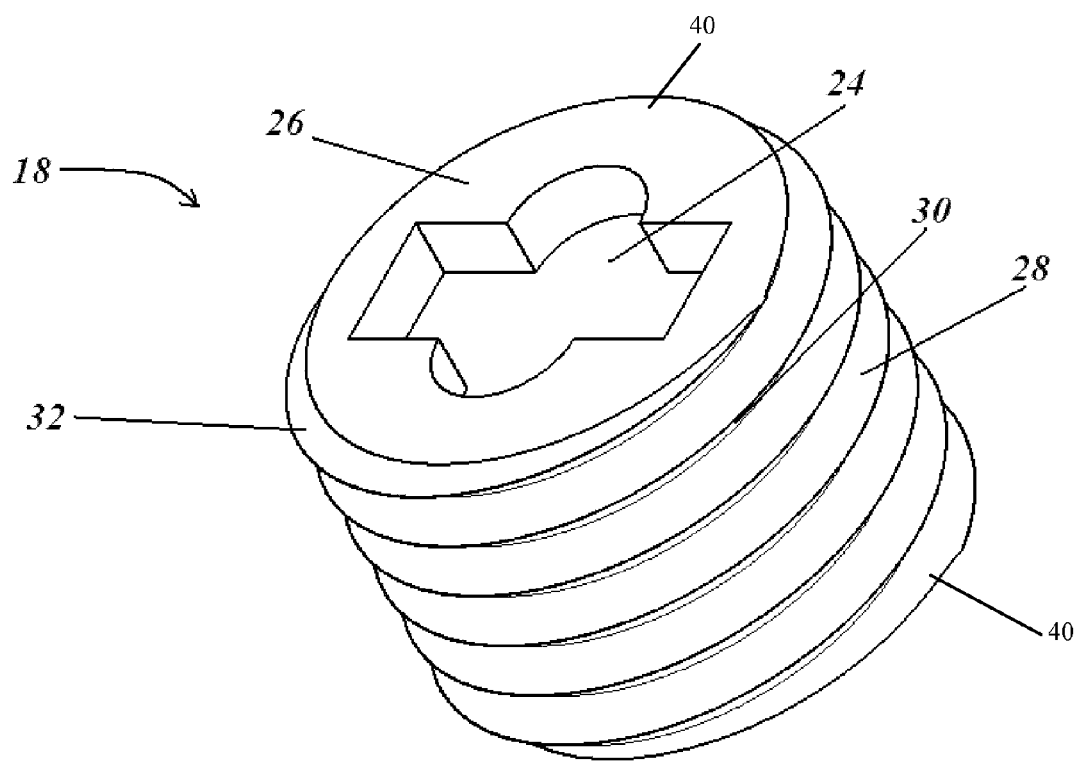
FIG. 5a is an isometric view of the outer spring end mount.
Figure 5B:
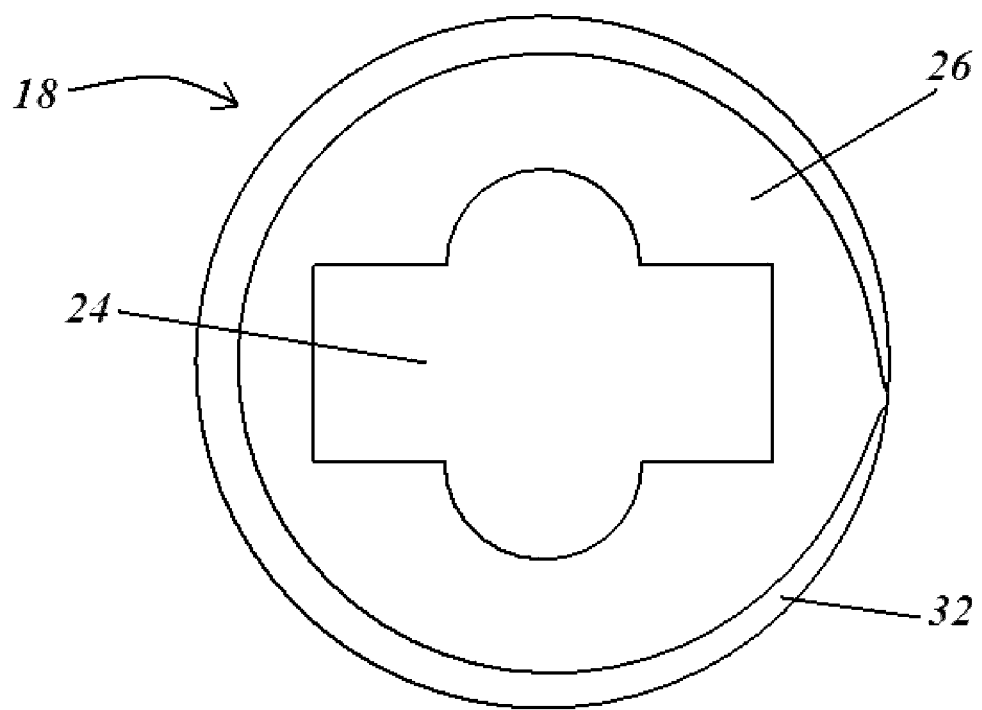
FIG. 5b is an end view of the outer spring end mount having a wider key-hole opening.
Figure 5C:
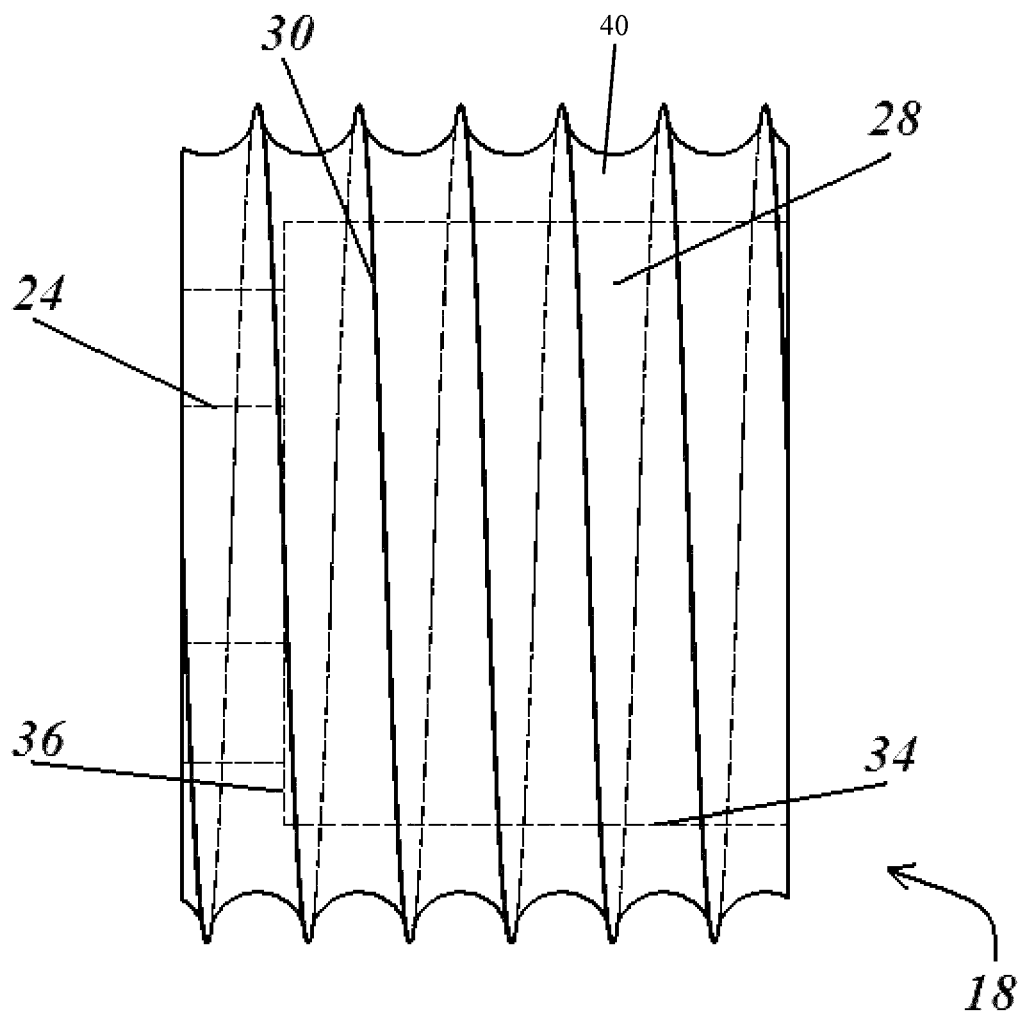
FIG. 5c is a side view of the outer spring end mount.

Turning now to the end mount 18 more specifically as seen in FIG. 5, there is a keyhole 24 created. This keyhole 24 extends through wall 26 of end mount 18 in order that the end mount 18 may fit over the end fixtures 20 and 21 attached to the outer spring. The keyhole 24 has the shape as shown on the wall 26 of the end mount. The hole shape is configured to provide clearance for fitting over one end of the fixture while being small enough to engage the inner spring mount or other stop as discussed below. The wall 26 of the end mount is preferably a flat surface on which a snap ring 22 rests to hold the end mount 18 in place as shown in FIG. 2. The coating 40 can be applied to any suitable region of the end mount 18 or to the entire external surface. In some embodiments the external, grooved region that engages the spring 16 is coated, but the remainder is uncoated. Preferably, only the final portion of the groove is coated, adjacent the final winding of the spring on the end mount near the exit of the spring from the end mount.

The end mount 18 also preferably has a recess such that it can nest over the inner end mount 14 and the inner spring 12. An inner surface 36 of wall 26 in the end mount 18 rests on the inner end mount 14 or the flange 15, if a flange is used. Alternately to a flange, a separate stop, such as a washer may be used. The inner surface 36 can be coated as described above. The shape of the keyhole 24 may be specific to the fixture or can be a fixed shape such as a circle (as in FIG. 5a). The keyhole 24 is created to allow the end mount 18 to fit over the end fixtures 20 and 21 attached to the outer spring 16 so that the spring 16 is able to be wound onto the end mounts 18. Fixtures 20 and 21 attached to the outer spring 16 may vary in shape, size and length depending on need from the desired application. Any portion of the fixtures 20, 21 can have a coating applied similar to what is described in detail above.

Also as noted in FIG. 5, the end mount 18 has a taper 32 which then turns into the grooves 28 that the outer spring 16 is wound onto. As previously noted, these grooves 28 may be spaced further apart than the natural resting pitch of the outer spring 16. The grooves 28 are constantly spaced and have a constant diameter. As the spring is wound onto the mount, the force to turn it on tends to enlarge the spring diameter. However, once mounted, the tensile forces during use tend to keep the spring securely mounted. The grooves 28 can have a coating 40 applied to help installation by reducing the friction between the end mount 18 and the spring 16. The coating 40 on the tapered portion can be thicker and stiffer than on other portions of the assembly 11 to further mitigate wear and to further reduce twisting and bending. The angle of taper can be increased for an application calling for a thicker coating to create more space between the fitting and the spring in which the thicker coating will more easily fit.

Figure 3:
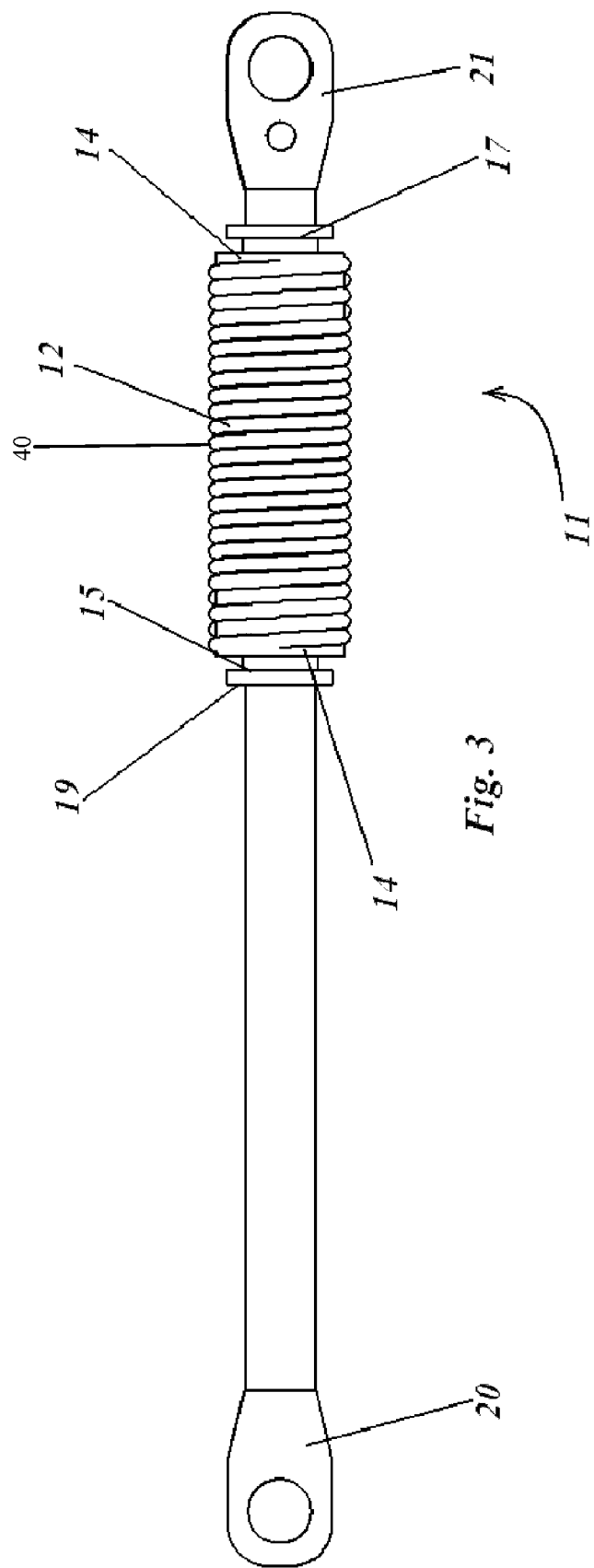
FIG. 3 is a side view of the inner portion spring assembly.

The cylindrical side wall 30 of the end mount 18 is preferably generally constant in diameter along its length, except of course for the variation introduced by the grooves in the outer portion of the wall. The inner hole 34 has a constant diameter that is able to fit over inner end mount 14 and shoulder 15 or 17 (as seen in FIG. 3). However, the inner hole 34 diameter is preferably tight enough around the inner end mount 14 and shoulder 15 or 17 that it does not slide around and come out of place. The inner hole surface 36 is preferably flat and perpendicular to the side wall 30 of the end mount 18. This allows the end mount 18 to rest on the shoulder 15 or the inner end mount 14 securely. The shoulder 15 can also be coated to mitigate wear and improve contact qualities similar to what is described above.

As shown in FIG. 2, the outer spring end mount 18 rests on the inner spring end mount 14. The inner spring end mount 14 has a machined shoulder 17 or a flange 15 with a wall 19, which serves the purpose of holding the outer spring 16 in place and provides a wall 19 for the outer spring end mount 18 to be fixed. Any surface of the end mount 14 can be coated with a coating similar to what is described above and for similar reasons. As a consequence of having two springs 12 and 16 in the assembly each spring can weigh less because of the added strength of including an additional spring. It is to be noted that the springs 12 and 16 coil in opposite directions. For this reason coupled with the fact that there are two tension springs 12 and 16, great strength is added to the apparatus. In some embodiments the inner spring 12 and outer spring 16 may contact one another. With the coating 40 applied to the external surface of the springs 12, 16, such contact does not adversely affect performance of the assembly 11.

Figure 4:
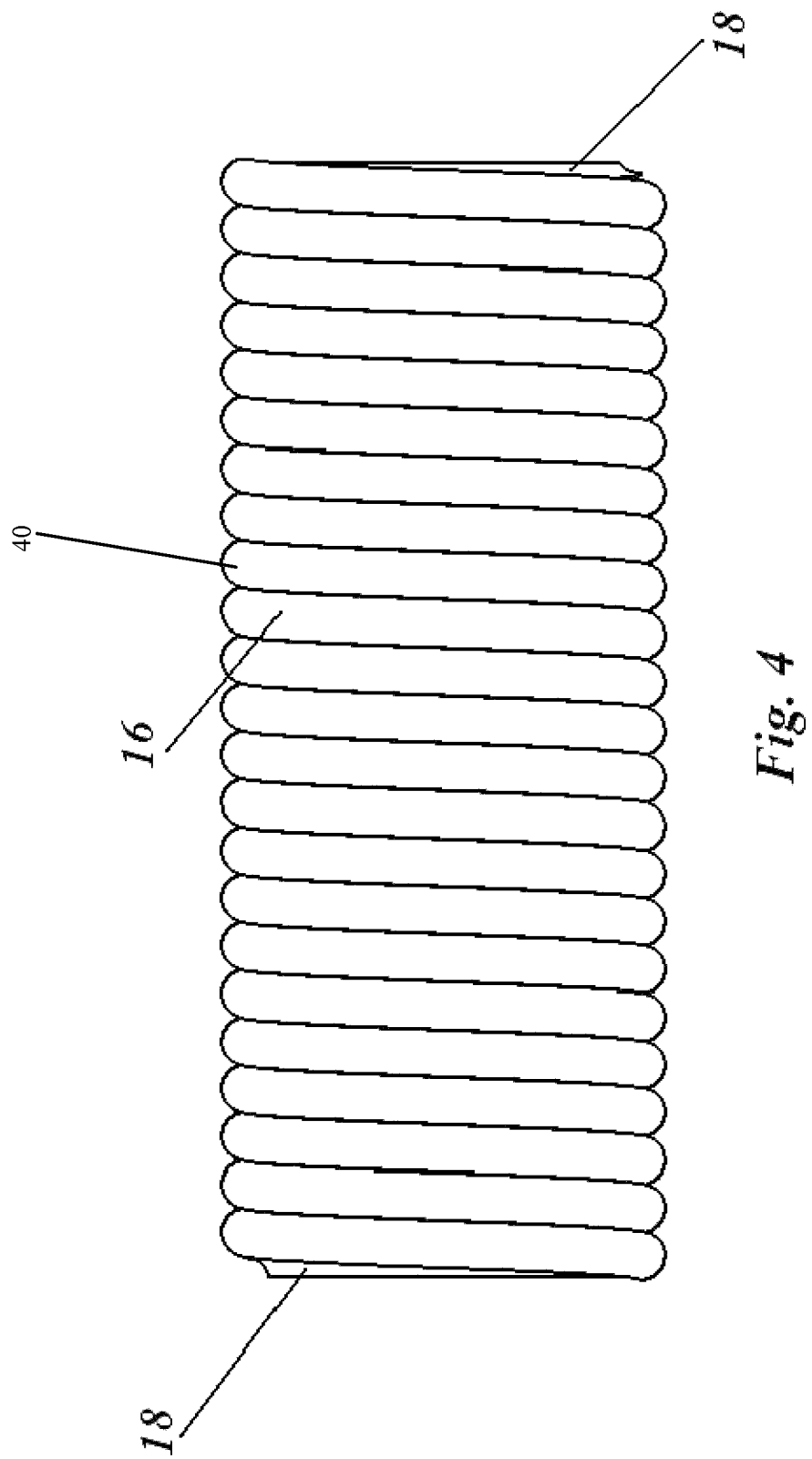
FIG. 4 is a side view of the outer spring assembly.

As tension is added to the springs 12, 16 they pull in opposing directions because they are wound oppositely. Incidentally, it will be appreciated that a greater factor of safety is added in the use of two springs 12, 16. As shown in FIG. 3 the apparatus is capable of functioning with the use of only one spring. The fixtures 20 and 21 are still securely connected and the embodiment can still function. Also, as shown in FIG. 4, the outer spring 16 can still function if the inner spring 12 fails. If one spring fails, the other one is still present and can function without the other. This added measure of safety is especially important as this device is often used in applications with high stress and multi-directional, vibrating, and/or high speed motion.

While the preferred embodiment of the invention has been illustrated and described, as noted above, many changes can be made without departing from the spirit and scope of the invention. For example, a safety rod could be added for an even higher measure of safety. Thus if both springs 12 and 16 were to fail, the rod would hold the fixtures together. The rod could be attached using keyholes from the rod into the fixtures.

Another example used in the application of securing the outer end mounts 18 could be the use of flanges. These flanges could take the place of the shoulder of the inner end mount. Flanges could be machined directly onto the fixtures 20 and 21 or arm of the fixture 20 and 21 depending on the application. These flanges would then hold the outer end mount 18 in place.

Also, depending on the fixture 20 and 21, differing sizes of outer end mounts 18 and keyholes may be used. In relation to the springs 12 and 16, differing sizes and materials may be used depending on the strength need and the function of the device. Free length, pitch, diameter, coil diameter, and the number of coils may all vary. Similarly the diameter of the outer end mounts 18 may vary depending on the outer spring 16 coil diameter and the size of the fixtures 20 and 21 attached.

Figure 7:
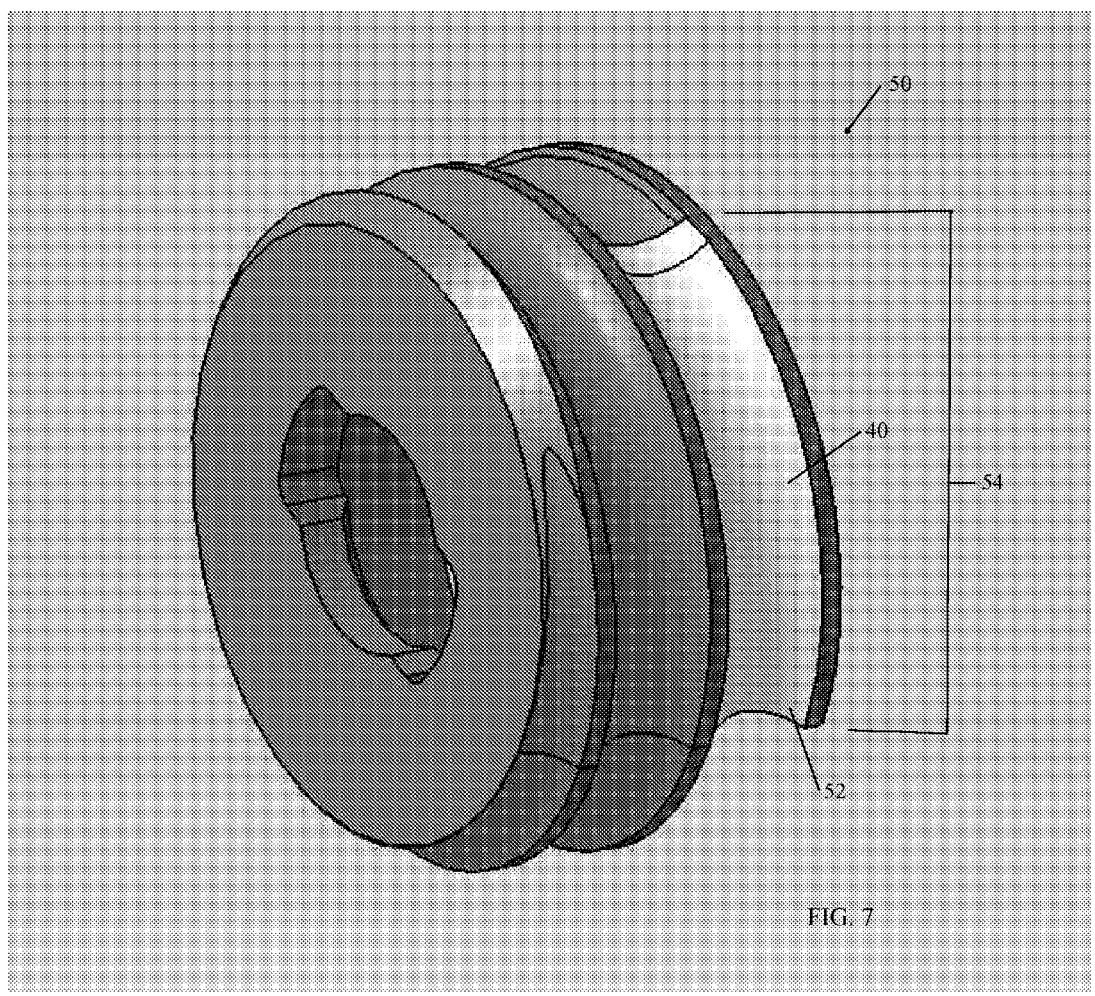
FIG. 7 is an isometric view of an end mount with a machined channel and a friction-resistant coating in the channel.

FIG. 7 illustrates an end mount 50 according to embodiments of the present disclosure in which a coating 40 has been applied to certain surfaces of the end mount 50. The end mount 50 is generally similar to other end mounts disclosed herein. The grooves of the end mount 50 come to an end 52. The final portion 54 of the groove is machined to have a slightly larger radius than the remainder of the coils to accommodate the thickness of the coating 40. The coating 40 can be applied to this final portion 54. When the spring is threaded onto this end mount 50, the coils exit the mount at end 52. Thus, this final portion 54 encounters most of the spring twisting and rubbing in use. The coating 40 helps to lessen the wear and early failure of the springs and fittings. The dimensions of the final portion 54 can be varied for a given application depending on how much the spring moves along the final portion 54 during use. The wear caused by the contact of the spring ends and the end mount are mitigated.

The dual-spring system can alternatively be more than two springs, even as many as four or five springs. These do not necessarily have to be nested. They may be secured one next to the other, however, this does not necessarily reduce the space envelope. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An end mount for a spring assembly, comprising:
a cylindrical body having a first end, a second end opposite the first end, and helical grooves that are configured to receive coils of a spring,
wherein a portion of the helical grooves adjacent the second end is configured to threadably receive the coils of the spring and at least one of the helical grooves has a first radius corresponding to a diameter of the coils; and
a friction-resistant coating intermediate at least a portion of contacting surfaces of the helical grooves and the coils that are received by the helical grooves such that friction between the contacting surfaces is reduced.

2. The end mount of claim 1, wherein the first end has a key hole configured to permit an end fixture to pass therethrough.

3. The end mount of claim 1, wherein an exterior shape of the end mount is tapered smaller from the second end to the first end.

4. The end mount of claim 1, wherein the friction-resistant coating is a nylon material.

5. The end mount of claim 1, wherein the end mount is made of stainless steel or titanium.

6. The end mount of claim 1, wherein the friction-resistant coating is applied using a powder-coating technique.

7. The end mount of claim 1, wherein the friction-resistant coating is approximately 0.011 inches thick.

8. The end mount of claim 1, wherein the portion of the helical grooves adjacent the second end has a second radius that is slightly larger than the first radius and wherein the friction resistant coating has a thickness approximately equal to a difference between the first radius and the second radius.

9. An end mount for securing a first tension spring to an end fixture,
the mount comprising:
a first mount body having curved sides and an end;

grooves arranged in a helical configuration on the curved sides of the mount body; and a friction-resistant coating that coats at least one contacting surface of the spring or the grooves of the first mount body when the grooves receive the spring such that friction associated with the at least one contacting surface is reduced.

10. The end mount of claim 9, wherein the friction-resistant coating is a nylon material.

11. The end mount of claim 9, wherein at least one of the first mount body and the spring is made of titanium.

12. The end mount of claim 9, wherein at least one of the first mount body and the spring is made of stainless steel.

13. The end mount of claim 9, wherein the friction-resistant coating is approximately 0.011 inches thick.

14. The end mount of claim 9, wherein the grooves having a coil diameter slightly larger than the coil diameter of the applied spring.

15. The end mount of claim 14, wherein the grooves have a pitch larger than the natural pitch of the spring in use.

16. The end mount of claim 9, wherein the curved sides include a substantially constant diameter such that the first mount body is a substantially cylindrical mount body that has a substantially constant diameter excepting a variation introduced by the grooves.

17. The end mount of claim 16, wherein the cylindrical mount body has a substantially constant length.

18. The end mount of claim 9, wherein the grooves surround the curved sides of the first mount body.

19. The end mount of claim 9, wherein the end of the first mount body comprises a circular, flat wall.

20. The end mount of claim 9, wherein the first mount body is at least partially hollow.

21. The end mount of claim 9, wherein an inner surface of the first mount body is cylindrical in shape.

22. The end mount of claim 21, wherein the inner surface has a constant diameter along its length.

23. The end mount of claim 21, wherein the inner surface of the first mount body does not extend completely through the first mount body and terminates before the end of the first mount body, the first mount body further having an opening in the end of the first mount body, the opening being smaller than an interior of the inner surface of the first mount body.

24. The end mount of claim 9, wherein the end fixture has an outer end and wherein a keyhole is formed by an opening in the end of the mount body, the keyhole being configured to allow passage of the outer end of the end fixture.

25. The end mount of claim 24, wherein the keyhole has a round shape.

26. The end mount of claim 24, wherein the keyhole is centered on the end of the mount body.

27. The end mount of claim 24, wherein the end fixture includes an inner end mount, and wherein the keyhole fits over the outer end but does not fit over the inner end mount.

28. The end mount of claim 9, wherein the grooves have a constant diameter along the curved sides of the end mount.

29. The end mount of claim 9, wherein the grooves have a constant pitch along the curved sides of the end mount.

30. The end mount of claim 9, further comprising a second mount body for securing a second tension spring at least partially within the first tension spring, wherein the first mount body has a greater diameter than the second mount body.

31. A tension spring mount assembly for coupling between a first component and a second component to control movement between the first and second components, the assembly comprising:

a first fixture configured for mounting to the first component, the first fixture having an inner end and an outer end, the outer end configured for mounting to the first component, the inner end having an abutment;

a second fixture configured for mounting to the second component, the second fixture having an inner end and an outer end for mounting to the second component;

a first tension spring coupled between the first and the second fixtures, the first spring having a first end coupled to the first fixture and a second end coupled to the second fixture;

a first spring mount coupling the first end of the first tension spring to the first fixture inner end; and a friction-resistant coating between contacting surfaces of two or more of the first fixture, the first component, the abutment, the second fixture, the second component, and the first tension spring, the first spring mount such that friction between the contacting surfaces is reduced.

32. The tension spring mount assembly of claim 31, wherein the friction-resistant coating is a nylon material.

33. The tension spring mount assembly of claim 31, wherein the friction-resistant coating is applied using a powder-coating technique.

34. The tension spring mount assembly of claim 31, wherein at least one of the first mount body and the spring is made of titanium.

35. The tension spring mount assembly of claim 31, wherein at least one of the first mount body and the spring is made of stainless steel.

36. The tension spring mount assembly of claim 31, wherein the friction-resistant coating is approximately 0.011 inches thick.

37. The tension spring mount assembly of claim 31, further comprising a first inner spring mount secured to the first fixture and a second spring secured to the first inner spring mount, the second spring being at least partially nested within the first spring.

38. The tension spring mount assembly of claim 31, wherein the first inner spring mount is the abutment securing the first spring mount.

39. The tension spring mount assembly of claim 31, further comprising a second spring mount coupled between the first spring and the second fixture, the second spring mount having an outer surface about which the first spring is wound, the second spring mount sliding over a portion of the second fixture, the second fixture having an abutment to secure the second spring mount from movement toward the inner end of the second fixture.

40. The tension spring mount assembly of claim 31, further comprising a second inner spring mount secured to the second fixture, the second spring being secured to the second inner spring mount.

* * * * *